United States Patent [19]

Buddenberg et al.

[11] 3,981,651

[45] Sept. 21, 1976

[54] DEVICE FOR PRODUCING PLATE-SHAPED WORKPIECES

[75] Inventors: Adolf Buddenberg; Bruno Hengst, both of Bad Driburg; Josef Weskamp, Bad Driburg-Alhausen, all of Germany

[73] Assignee: Adolf Buddenberg GmbH, Bad Driburg, Germany

[22] Filed: May 20, 1974

[21] Appl. No.: 471,690

[30] Foreign Application Priority Data

May 19, 1973 Germany .......................... 2325508

[52] U.S. Cl. .............................. 425/83; 19/156.3; 28/72.2 F; 425/371

[51] Int. Cl.² .................... B29C 13/00; D01G 25/00

[58] Field of Search ............ 425/83, 224, 335, 337, 425/371; 264/109, 121; 19/156.3; 28/72.2 F

[56] References Cited

UNITED STATES PATENTS

| | | | |
|---|---|---|---|
| 1,765,026 | 6/1930 | Miller | 425/83 X |
| 2,188,373 | 1/1940 | Pearce | 425/83 X |
| 2,975,470 | 3/1961 | Snelson et al. | 425/83 X |
| 3,096,227 | 7/1963 | Van Elten | 425/373 X |
| 3,353,225 | 11/1967 | Dodson, Jr. et al. | 28/72.2 F X |
| 3,396,433 | 8/1968 | Roxlo | 19/156.3 |
| 3,482,287 | 12/1969 | Flewwelling | 19/156.3 |
| 3,543,351 | 12/1970 | George | 19/156.3 |

*Primary Examiner*—Robert L. Spicer, Jr.
*Attorney, Agent, or Firm*—Herbert L. Lerner

[57] ABSTRACT

A device for producing plate-shaped workpieces from comminuted material introduced by an air current into a forming chamber located downstream of a material supply channel, in supply direction of the material, the forming chamber being defined at upper and lower sides thereof by a pair of endless revolving conveyor and compression belts spaced from and located above one another, one of the belts being formed with air passage openings therein, the improvement therein including an air blow channel connected to the material supply channel and adjusted to a given width of a fleece to be formed from the comminuted material, and air flow regulator means disposed in the air blow channel for effecting a uniform air flow velocity over the entire cross-sectional width of the air blow channel and for determining flow direction of the air current.

15 Claims, 5 Drawing Figures

DEVICE FOR PRODUCING PLATE-SHAPED WORKPIECES

The invention relates to a device for producing plate-shaped workpieces from comminuted material such as fibrous material, especially, like wood shavings or chips or the like, introduced by an air current into a forming chamber located downstream of a material supply channel, in supply direction of the material, the forming chamber being defined at upper and lower sides thereof by a pair of endless revolving conveyor belts spaced from and located above one another, at least one of the belts being formed with air passage openings therein.

Such devices for producing plate-shaped workpieces from comminuted material have become known heretofore in various forms of construction and operate to form a fleece of shavings or chip material with blown air or injection air so that an air current moving the shavings or chip material is produced by a blower or an injector.

In spite of high engineering costs, these heretofore known devices have the disadvantages that fleece of non-uniform density is formed and the mode of operation thereof has inadequate efficiency.

Because of air current supply lines which inevitably vary in cross section, as well as because of friction losses at the edges thereof, varying flow velocities occur over the entire width of the guide channel and have a deleterious effect upon the uniformity of the fleece density.

It is accordingly an object of the invention to provide a device for producing plate-shaped workpieces from comminuted material according to the aforementioned type wherein the uniformity of the fleece density and the operational efficiency of the device are improved.

It is a further object of the invention to provide such a device which, for the purpose of forming fleece in a simple and reliable manner, operates with an air current or flow that has a uniform flow velocity over the entire width of the flow channel and thereby also of the fleece width, and thereby forms a fleece which has a very uniformly dense or compact cross section and a very uniformly dense surface.

It is another object of the invention to provide such a device wherein a good and uniform advancement of the fleece to the forming chamber is effected accompanied by a desirably effective orientation of the shavings or chips within the fleece due to the air current or flow moving and forming the fleece.

It is yet another object of the invention to provide such a device wherein an air current or flow, that is composed of blown air and injection air, is adjustable in direction thereof to obtain more-or-less high turbulence in a relatively simple manner and can be conducted in the desired directions. An additional object is to provide such a device wherein the blowing air flow or current as well as the flow of injection air are separately regulatable.

It is a further object of the invention to provide such a device which, in its entirety, is of relatively simple and economical construction and operates efficiently.

With the foregoing and other objects in view, there is provided in accordance with the invention, a device for producing plate-shaped workpieces out of comminuted material, such as fibrous material, especially, like wood shavings or chips or the like, of the aforementioned type, wherein a blow channel for an air supply is connected to a material supply channel and has a width which is adjusted to the width of the fleece being produced from the chip material, and furthermore an air flow regulator is disposed at a specific location of the channel system and ensures a uniform air flow velocity over the entire cross-sectional width of the blown air supply channel, or effects an increase in the air flow velocity at the edges of the channel to compensate for subsequent friction losses, adjusts in a desired manner the direction in which the air is blown, and produces a considerable reduction in the static flow pressure at the location at which the chip material is introduced.

In accordance with another feature of the invention, a fleece-forming and supply channel is connected to and forms an extension of the blow channel and a plurality of injector nozzles are spaced from and located downstream of the air flow regulator for moving the fleece through the fleece-forming and supply channel to the forming chamber and for orienting or adjusting the comminuted material.

In accordance with a further feature of the invention, the air flow regulator is formed of a wall or a body which divides the blow channel into two partial channels located one above the other, the upper partial channel being connected with the material supply i.e. the supply channel for the shavings or chips, and forms a material collecting surface. The air flow regulator has an upper parabolically curved surface which increases the height of the upper channel portion as it extends outwardly toward both lateral regions thereof, so that, along the entire channel cross section which increases from the channel width halves outwardly to both sides of the channel, a uniformly large air current or flow exists which produces uniform displacement of the shavings or chips present in the vicinity of this partial channel and thereby effects fleece-formation of uniform density along the entire cross section and entire surface. The regulator is mounted so as to be pivotable upwardly and downwardly in the blow channel so as to adjust the direction of blowing.

In accordance with added features of the invention, the fleece supply channel extends coaxially to the blow channel and begins in the impact or junction region between the blow channel and the comminuted material supply channel. The fleece supply channel is provided with at least one row of injector nozzles, respectively at the upper and lower sides thereof located spaced from and downstream of the air flow regulator. The injector nozzles are disposed at an acute angle to the channel, substantially in the direction of blowing, and are infinitely adjustable in angle of incidence thereof within a given range of angles of substantially 10° to substantially 40°. To overcome and compensate for the very large frictional forces present in the lateral regions of the channel, the injector nozzles, that are disposed in rows transversely to the longitudinal direction of the channel, are arranged closer to one another at both lateral regions of the channel than in the middle thereof. Moreover, the injection nozzles can be supplied with air at uniform or at different pressure.

In accordance with concomitant features of the invention, due to the adjustable air flow regulator, the shavings or chips are blown into the fleece supply channel with uniform density, and the injection nozzles effect an additional underpressure or negative pressure which produces a suction effect on the shavings or chips and a movement of the fleece. Furthermore, due to the direction in which the air is blown and the injector nozzles, a given adjustable turbulence is produced within the supply channel due to which desired orientations of the shavings or chips at their location within the fleece are achieved.

Other advantageous features of the invention are described hereinafter and defined in the claims.

The scope of the invention, as aforementioned, is not limited to the features described hereinafter and claimed in the claims appended hererto but also to combinations of those features and of those claims.

The device of the invention, as aforementioned, is of relatively simplified and economical construction and affords, with efficient operation and relatively low engineering costs, the formation of shavings or chip fleeces and wood fiberboards with uniform chip or shavings density along the entire cross section and the entire surface thereof.

The shavings or chips are compressed through the combination of blown air and suction into a fleece and displaced as a uniformly dense fleece to a plate or board forming chamber.

Due to the air flow velocity and air flow direction regulator located in the blow channel, the shavings or chip material present therein and moved by the blown air are subjected along the entire fleece width to a uniformly dense compression and, due to the suction air becoming effective thereafter, a uniform movement of the fleece, on the one hand, and a more-or-less strong orientation of the shavings or chips, on the other hand, occurs within the fleece, whereby intermixing of the shavings or chips and avoidance of hard clump formation are simultaneously effected by turbulence.

The device of the invention operates in an advantageous manner with air which moves in a circulatory loop, and is of relatively simple technical construction, so that with relatively few means, a high operating efficiency and a material plate or board of good quality are attained.

Due to the regulator in the blow channel which is adjustable in the inclination thereof, and the injection nozzles that are adjustable in the angle of inclination thereof to the longitudinal direction of the fleece supply channel, there is achieved a conduction of the air flow to attain different or, on a large scale, desired turbulence which in addition to a good advancement of the shavings or chip material, assures the relatively faultless uniform fleece density.

Although the invention is illustrated and described herein as embodied in device for producing plate-shaped workpieces it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is diagrammatic elevational view of a device for producing fiberboards that includes a fleece supply channel connected to a forming or molding chamber, an air blow channel located in front of i.e. upstream of, and forming an extension to or elongation of the fleece supply channel and having therein an air flow speed regulator, a material supply channel extending substantially in air flow direction and joining at an acute angle with the blow and fleece supply channel, and a plurality of injector nozzles located in the fleece supply channel;

Figure 1:
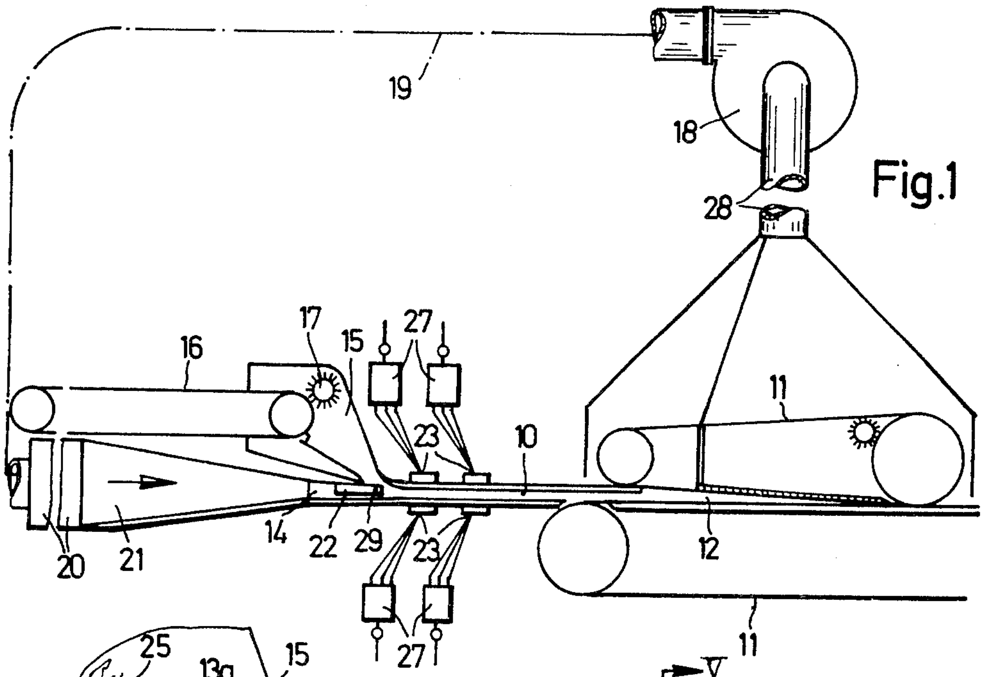

Referring now to the drawing, and first particularly to FIG. 1 thereof, there is shown the device for producing plate or board-shaped workpieces of comminuted materials, such as fibrous materials like wood shavings or chips, for example, constructed in accordance with the invention and having a fleece-forming and supply channel 10, corresponding in cross-sectional width and height with the cross section of the fleece that is to be formed, and which has a rectangular cross section, the larger cross-sectional dimension of which extending substantially horizontally or lying substantially flat.

Figure 2:
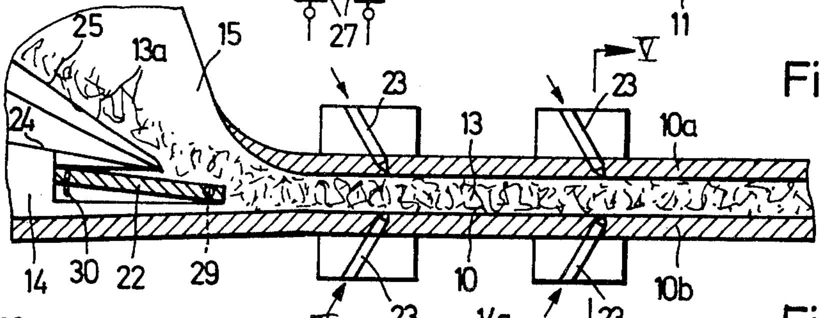
FIG. 2 is a fragmentary enlarged view of FIG. 1 showing in longitudinal cross section the fleece supply channel and the injector nozzles located therein, and the air blow channel with air flow speed and direction regulator and the material supply channel connected to the fleece supply channel.
Figure 3:
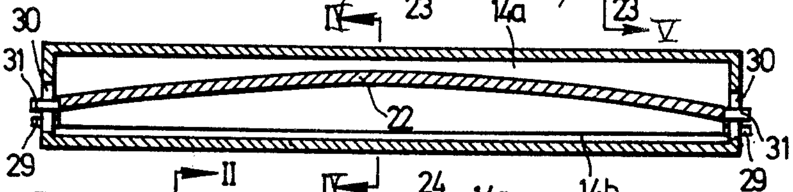
FIG. 3 is a cross-sectional view of the air blow channel shown in FIG. 4 and taken along the line III—III in the direction of the arrows.
Figure 4:
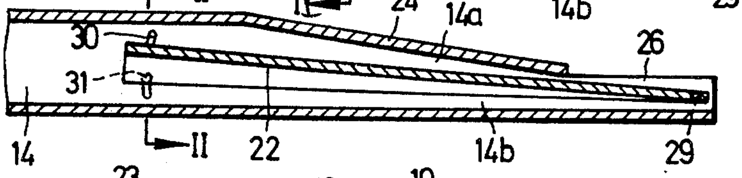
FIG. 4 is a fragmentary, longitudinal sectional view of FIG. 3 showing the blow channel and taken along the line IV—IV in the direction of the arrows.
Figure 5:
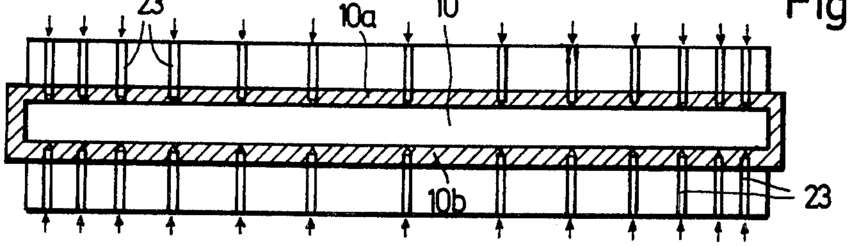
FIG. 5 is a cross-sectional view of FIG. 2 taken along the line V—V in direction of the arrows and showing the fleece supply channel and injector nozzles disposed in the upper and lower walls thereof as shown in the figure.

A board-or plate-forming chamber 12, defined by two endless revolving conveyor and compressor belts 11 that are disposed in spaced relationship one above the other, is connected to the fleece-forming and supply channel 10 at a location behind or downstream therefrom as viewed in direction of travel of the fleece supply therein indicated by the arrow in FIG. 1. The fleece 13 (FIG. 2) is introduced into the plate-forming chamber 12 by an air current and is subjected therein to further essential compression.

As an extension or elongation of the fleece supply channel 10, there is provided an air blow channel 14 which aids in introducing material shavings or chips 13*a* (FIG. 2) into the fleece supply channel 10, the air blow channel 14 being connected to a material supply channel 15. The fleece supply channel 10 extends in blowing direction of the air blow channel 14 represented by the arrow in FIG. 1, behind the material supply channel 15 which is disposed at an angle, preferably an acute angle, to both coaxial channels 10 and 14 in direction of blowing and is connected from above with both channels 10 and 14, as viewed in FIGS. 1 and 2.

The material shavings or chips 13*a* traveling from above, for example, over a conveyor belt 16 and directed by a throw-off roller 17 at an inclination downwardly and in blowing direction, as represented by the arrow in FIG. 1, are introduced by the air blast in the air blow channel 14 into the fleece-forming and supply channel 10 and fed by an air current applied to the supply channel 10 to the forming channel or chamber 12.

At least one of the two forming chamber belts 11 that are located one above the other is provided with air passageway openings, are pre se pervious to air, so that the air current serving to move the fleece can be sucked out of the forming chamber 12 during the fleece compression operation (the plate or board pressing operation) by a suction and pressure blower 18 at a side of the forming chamber 12.

A line 19 extending from the blower 18 is connected to a storage chamber 20 that is of uniform cross section along the entire length thereof and merges in blowing direction with an acceleration channel 21 having a varying cross section that runs into the blow channel 14, which has a rectangular cross section, the larger cross-sectional dimension of which being substantially horizontal or lying substantially flat, and which corresponds in cross-sectional shape and size to the fleece supply channel 10.

In the air blow channel 14, which has been adjusted to the width of the fleece 13 to be formed from the chips or shavings 13*a*, there is located an air current or air flow regulator 22 which effects a uniform flow velocity of the blowing air in the blowing air flow channel 14 over the entire width (the entire cross section) thereof and determines the direction of the blowing air. The air flow regulator 22 extends partly inside the air blow channel 14 and partly projects into the impact region between the end region of the air blow channel 14 and the material supply channel 15.

At a location spaced downstream from the air flow regulator 22 (as viewed in the direction of blowing represented by the arrow in FIG. 1), a plurality of injector nozzles 23 are connected to the fleece-forming and supply channel 10. The injector nozzles 23, on the one hand, effect an orientation or adjustment of the chips or shavings 13*a* in the fleece 13 and, on the other hand, an accelerated conveyance of the fleece 13 to the forming chamber 12 as well as a tight compaction or packing of the fleece.

The air flow velocity regulator 22 divides the air blow channel 14 into two partial channels 14*a* and 14*b* lying one above the other. The upper partial channel 14*a* is connected by the rear end region thereof, as viewed in blowing direction, with the material supply channel 15, because the upper wall 24, along a longitudinal portion, for example, along half the length of the regulator 22, coincides with the lower, inclined wall 25 of the supply channel 15, the blown air emerging from this upper partial channel 14*a* serving to advance the chips or shavings 15.

The through cross section of both of these partial channels 14*a* and 14*b* and especially the inlet and outlet openings thereof are disposed in such a relationship one to the other that, in the upper partial channel 14*a*, the static pressure of the flow is substantially equal to the outside pressure and at least the flow velocity necessary for advancing the chip material prevails. Downstream of the regulator 22, as viewed in the direction of blowing, both of the partial channels 14*a* and 14*b* are reunited in the supply channel 10.

The air flow velocity regulator 22 has a cross section that increases in elevation from the channel width halves out to both partial channel side regions so that lower boundary of the upper channel 14*a* formed by the regulator 22 increases in elevational direction toward the sides and due to this lateral increase in cross section, a uniform flow velocity along the entire width of the channel part 14*a* is attained.

The regulator 22 is formed of a wall or body convexly arched and preferably parabolically curved at the forward end region thereof as viewed in direction of blowing represented by the arrow in FIG. 1, and gradually becoming flat or planar at the rearward end region thereof as viewed in blowing direction, and extending parallel to the cross-sectional width of the lower channel area.

The height of the inlet cross section of the upper partial channel 14*a*, into which the shavings or chip material 13*a* is introduced, increases in accordance with a parabolic function from the middle to the side thereof and, in direction of blowing, this arching of the channel dividing surface becomes flatter and finally changes into a planar surface substantially at the location at which it encounters or is engaged by the shavings or chip material 13*a*.

Instead of an arched wall as regulator 22, a body can be provided which has a parabolically arched upper surface and a planar lower surface.

Due to this construction wherein the cross section of the upper partial channel 14*a*, which serves mainly for advancing the shavings or chip material, increases laterally, uniform density of the shavings or chip material along the entire width of the fleece 13 is attained by means of the blowing air during the advancement of the shavings and chip material.

A multiplicity of injector nozzles 23 is connected to the fleece supply channel 10 in the upper and lower walls thereof behind or downstream of the regulator 22, as viewed in blowing direction, which lies in the junction vicinity of the three channels 10, 14 and 15. The injector nozzles 23 are located adjacent and spaced one from another in tandem across the entire cross-sectional width of the fleece supply channel 10, and the transverse rows of nozzles can be disposed at an acute or similar angle of incidence so that the air flow direction therethrough is substantially in the blowing direction represented by the arrow in FIG. 1.

Furthermore, the orientation of the shavings or chips in the fleece 13 that is formed is dependent upon the spacing between the deposition ledge or region 26 and the inlet opening for the compressed or pressurized air (the first nozzle row in direction of fleece travel), the minimum orientation or adjustment of the shavings or chips occurring when the last-mentioned spacing is very small and the angle of incidence of the nozzles is relatively large.

A high turbulence is always desirable if a very pronounced shavings or chip orientation can be dispensed with.

The turbulence accordingly promotes a considerable increase in the capacity of the flow to be laden with shavings or chip material, because the particles of the material are prevented from sinking to the floor of the channel. Due to strong turbulence, the efficiency of the device is thus considerably increased and, in addition, the possible formation of clumps in the coherent shavings or chip material 13*a* is avoided.

Because of the injector nozzles 23 that are disposed at an inclination in the fleece advancement direction and the air blowing direction, a strong underpressure or negative pressure is formed in the starting region of the fleece supply channel 10 (the location at which the material is introduced), which sucks the shavings or chip material 13*a* into the supply channel 10. Moreover, the velocity and turbulence of the flow are thereby considerably increased, whereby the loading or charging thereof with the chip or shavings material can be markedly increased. The advancing material 13 per se is mixed and whirled about by the energy-rich pressurized air streams of the nozzles 23. Any agglomerations or clumps that might be formed are broken up and dispersed. The shavings or chip guiding air current travels through a transition channel to the fleece forming or molding chamber 12. The air that passes through the air-pervious conveyor belts is exhausted with the aid of suitable means such as a suction device, for example. The exhaust line 28 can be connected to the suction side of the blower 8, as shown in FIG. 1, so that a single closed circulatory loop of the air is formed.

In an advantageous manner, the rear end of the regulator 22, as viewed in blowing direction, is swingable back and forth about a pivot axis 29 to adjust the cross sections of the partial channels 14*a* and 14*b* to varying sizes and to adjust the air flow direction of the blowing air. The regulator 22 is arrestable with infinite variability in the swung or pivoted position thereof by suitable securing means such as threaded or tensioning members 31 enclosed or received in slots 30 formed in the channel 14. The securing means 30, 31 are located at the forward end region of the regulator 22 as viewed in blowing direction.

Due to the upwardly and downwardly pivotable regulator 22, the direction in which the current of blowing air enters the fleece supply channel 10 can be varied with respect to the angle of incidence thereof and can be so determined that the turbulence required for the dense fleece formation will occur, the turbulence being lower when the direction of incidence is closer to axial direction, and the turbulence being higher when the direction of incidence is inclined to the axial direction.

The same results are attained by inclined positioning of the injection nozzles 33 and due to locating the nozzles 23 closer together in the marginal regions of the channel or due to varying the pressure in the pressurized air supply to the nozzles 23.

As shown in FIG. 1, at least two rows of injection nozzles 23 are provided extending in direction of the width of the fleece supply channel 10 in each wall thereof that is located one above the other. A pair of pressurized or compressed air chambers 27 are each connected to the nozzles of one of the rows, respectively, each of the presurized air chambers being subdivided (not shown in the drawing) into individual partial chambers containing air at varying pressures.

We claim:

1. In a device for producing plate-shaped workpieces from comminuted material introduced by an air current into a forming chamber located downstream of a material supply channel, in supply direction of the material, the forming chamber being defined at upper and lower sides thereof by a pair of endless revolving conveyor and compression belts spaced from and located above one another, one of the belts being formed with air passage openings therein, the improvement therein comprising a separate material supply channel and air blow channel which come together with an adjustable air flow regulator, in the air blow channel, which terminates at the juncture of the air blow channel and the material supply channel, a fleece-forming and supply channel connected to and forming an extension of said air flow channel, and a plurality of injector nozzle means spaced from and located downstream of said air flow regulator for moving the fleece through the fleece-forming and supply channel to the forming chamber and for orienting the comminuted material.

2. Device according to claim 1 wherein said air blow channel has a substantially rectangular cross section, the larger dimension of which extends in fleece-width direction, said air blow channel being divided by said air flow regulator into two partial channels located one above the other, the upper channel and the comminuted material supply channel being mutually connected and forming at the connection thereof a comminuted material deposition region.

3. Device according to claim 2 wherein said air flow regulator is of such shape as to increase the height of the upper partial channel of said air blow channel from the inner end of each of the channel width halves to the respective lateral regions of said blow channel.

4. Device according to claim 3 wherein said air flow regulator is formed of a wall convexly arched at the forward end region thereof in direction of air flow through said blow channel, and gradually becomes planar at the rearward end region thereof in said direction of air flow and extending substantially parallel to the cross-sectional width of said blow channel.

5. Device according to claim 3 wherein said air flow regulator comprises a body having a parabolically arched upper surface and a substantially planar lower surface.

6. Device according to claim 3 wherein said air flow regulator is mounted in said blow channel so as to be swingable upwardly and downwardly to form partial channels of varying size and for adjusting the direction of air flow through said blow channel, said air flow regulator having a rear end, as viewed in said direction of air flow, said rear end thereof being pivotable about a pivot axis extending in direction of the width of said blow channel, and including securing means for arresting said regulator at infinitely variable pivot positions thereof.

7. Device according to claim 6 wherein said securing means comprises a threaded member on said air flow regulator received in a slot formed in a side of said blow channel.

8. Device according to claim 6 wherein said securing means comprises a tensioning member on said air flow regulator received in a slot formed in a side of said blow channel.

9. Device according to claim 6 wherein said air flow regulator extends partly inside said blow channel and partly into an impact region between said fleece supply channel and said comminuted material supply channel, the latter channel being connected at an acute angle to said blow channel as viewed in direction of air flow.

10. Device according to claim 9 including a multiplicity of air nozzles connected to said fleece supply channel in the upper and lower walls thereof, said air nozzles being located adjacent and spaced one from another across the cross-sectional width of said fleece supply channel, said nozzles having an air flow direction inclined at an acute angle to the direction of air flow in said blow channel, said nozzles having an adjustable angle of incidence to longitudinal direction of said blow channel.

11. Device according to claim 10 wherein said acute angle is substantially 10° to substantially 40°.

12. Device according to claim 10 wherein at least one row of said nozzles extending in direction of width of said fleece supply channel is provided in each wall of said fleece supply channel that is located one above the other, said nozzles of said row being uniformly spaced one from another in a middle region of the width of said fleece supply channel and being located closer to one another in both lateral regions of said fleece supply channel.

13. Device according to claim 12 including at least two rows of said nozzles, and a pair of pressurized air chambers each connected to the nozzles of one of said rows, respectively, each of said pressurized air chambers being subdivided into individual partial chambers containing air at varying pressures.

14. Device according to claim 13 including an acceleration channel connected to said blow channel upstream thereof as viewed in direction of air flow through said blow channel, a storage chamber connected to said acceleration channel upstream thereof, said acceleration channel having a cross-sectional shape and size reducing in direction toward said blow channel to the cross-sectional shape and size of said blow channel, an air blow line connected to said storage chamber, an air blower connected by a suction line with said forming chamber, said air blower being connected on the pressure side thereof by said air blow line to said storage chamber so as to form an air circulatory loop.

15. Device according to claim 1 wherein the comminuted material is fibrous material.

* * * * *